(12) United States Patent  
Jain et al.

(10) Patent No.: US 12,405,920 B2  
(45) Date of Patent: *Sep. 2, 2025

(54) DATA FILE CLUSTERING WITH KD-CLASSIFIER TREES

(71) Applicant: Databricks, Inc., San Francisco, CA (US)

(72) Inventors: Prakhar Jain, Sunnyvale, CA (US); Frederick Ryan Johnson, Orem, UT (US); Terry Kim, Bellevue, WA (US); Vijayan Prabhakaran, Los Gatos, CA (US); Bart Samwel, Oegstgeest (NL)

(73) Assignee: Databricks, Inc., San Francisco, CA (US)

(*) Notice: Subject to any disclaimer, the term of this patent is extended or adjusted under 35 U.S.C. 154(b) by 231 days.

This patent is subject to a terminal disclaimer.

(21) Appl. No.: 18/218,410

(22) Filed: Jul. 5, 2023

(65) Prior Publication Data

US 2025/0013606 A1 Jan. 9, 2025

(51) Int. Cl.
| | |
|---|---|
| *G06F 16/10* | (2019.01) |
| *G06F 16/13* | (2019.01) |
| *G06F 16/16* | (2019.01) |
| *G06F 16/22* | (2019.01) |
| *G06F 16/28* | (2019.01) |

(52) U.S. Cl.  
CPC ............ *G06F 16/16* (2019.01); *G06F 16/134* (2019.01); *G06F 16/2246* (2019.01); *G06F 16/285* (2019.01)

(58) Field of Classification Search  
CPC .... G06F 16/16; G06F 16/134; G06F 16/2246; G06F 16/285  
See application file for complete search history.

(56) References Cited

U.S. PATENT DOCUMENTS

| | | | |
|---|---|---|---|
| 8,463,825 B1* | 6/2013 | Harty | G06F 16/188 |
| | | | 711/100 |
| 10,769,130 B1* | 9/2020 | Armbrust | G06F 16/2282 |
| 10,845,991 B2* | 11/2020 | Danilov | G06F 3/0679 |
| 2018/0285002 A1* | 10/2018 | Hayasaka | G06F 12/0811 |
| 2020/0125558 A1* | 4/2020 | Dageville | G06F 16/2386 |
| 2020/0334272 A1* | 10/2020 | Hrastnik | G06F 16/245 |
| 2021/0004296 A1* | 1/2021 | Gupta | G06F 11/1451 |
| 2022/0374532 A1* | 11/2022 | Zaharia | G06F 3/0655 |

* cited by examiner

*Primary Examiner* — Mahesh H Dwivedi  
(74) *Attorney, Agent, or Firm* — Fenwick & West LLP

(57) ABSTRACT

A data processing service generates a data classifier tree for managing data files of a data table. The data classifier tree may be configured as a KD-classifier tree and includes a plurality of nodes and edges. A node of the data classifier tree may represent a splitting condition with respect to key-values for a respective key. A node of the data classifier tree may be associated with one or more data files assigned to the node. The data files assigned to the node each include a subset of records having key-values that satisfy the conditions represented by the node and parent nodes of the node. The data processing service may efficiently cluster the data in the data table while reducing the number of data files that are rewritten when data is modified or added to the data table.

23 Claims, 10 Drawing Sheets

DATA FILE CLUSTERING WITH KD-CLASSIFIER TREES

TECHNICAL FIELD

This disclosure relates generally to data storage technologies, and more particularly to clustering data files for a data table.

BACKGROUND

A data processing service may manage a significant amount of data for one or more entities in various forms, such as raw data or data tables. A data table may include a plurality of records or instances, where each record includes values for one or more features. The data processing service may manage data tables with many records as one or more data files, in which a data file includes a respective subset of records of a data table. Thus, the data processing service may manage large file repositories. Moreover, the data processing service may receive requests from users to perform one or more transaction operations on a data table that include, for example, read or write operations. For example, a user (e.g., data analyst) associated with an entity may request that the data processing service modify a data table to include a new set of records for the entity.

In some instances, the data processing service performs a clustering process to change the layout of the data or change the distribution of the data with respect to one or more key-values, such that records with similar key-values are collocated in the same data file. A key-value is a value for a key feature in the data table (e.g., user or date column). In this manner, when performing read operations that are only relevant to records with certain key-values in the data table, the data processing service can skip data files that do not have relevant key-values, saving computing resources. However, managing a significant number of clustered data files can be difficult as often, many data files have to be rewritten to incorporate new or modified data into the data table, for example, when the new or modified data has a relatively uniform distribution with respect to the key-values. This results in significant delay in completing the transaction operation on cloud storage systems.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or system) for generating a data classifier tree for managing data files of a data table and performing one or more transaction operations to the data table based on the data classifier tree. In some embodiments, a data classifier tree for a data table is configured as a KD-classifier tree and includes a plurality of nodes and edges. A node of the data classifier tree may represent a splitting condition with respect to key-values for a respective key. A node of the data classifier tree may be associated with one or more data files assigned to the node. The data files assigned to the node each include a subset of records having key-values that satisfy the conditions represented by the node and parent nodes of the node. By using the data classifier tree, the data processing service may efficiently cluster the data in the data table while reducing the number of data files that are rewritten when data is modified or added to the data table.

Figure 1A:
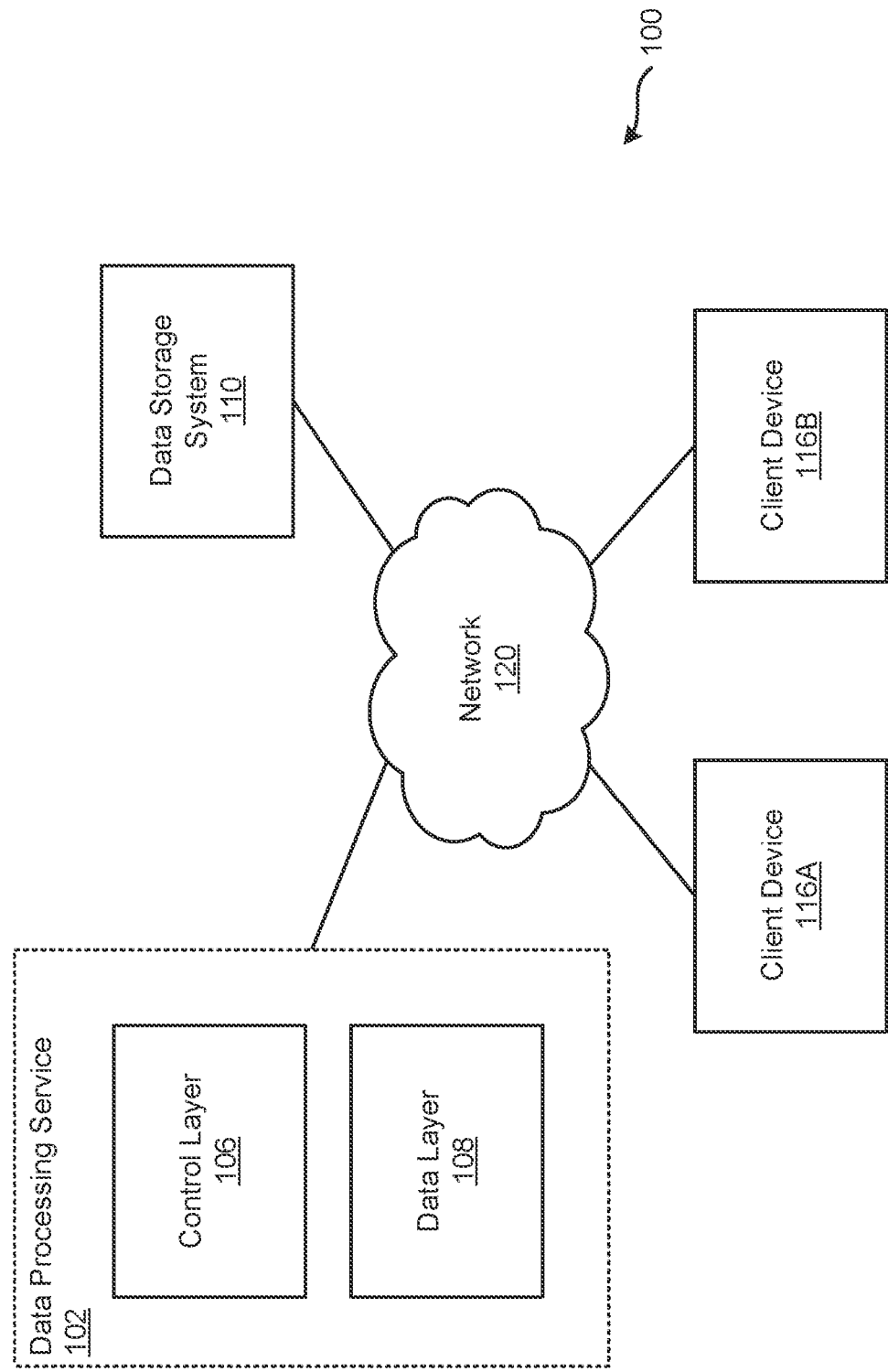
FIG. 1A is a high-level block diagram of a system environment for a data processing service, in accordance with an embodiment.

FIG. 1A is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and one or more data storage systems 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing system 102 may receive requests from users of client devices 116 to perform one or more data processing functionalities on data stored, for example, in the data storage system 110. The requests may include query requests, analytics and intelligence requests, or machine learning and artificial intelligence requests, on data stored in the data storage systems 110. The data processing service 102 may provide responses to the requests to the users of the client devices 116 after they have been processed.

In one embodiment, as shown in the system environment 100 of FIG. 1A, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests received from the client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

As described in more detail below, in one embodiment, the data processing service 102 provides a method by which a data classifier tree for managing data files of a data table is generated, and one or more maintenance or read operations to the data table are performed based on the tree. The nodes of the data classifier tree represent conditions with respect to key-values for one or more keys, and in one instance, two or more keys. A node of the data classifier tree is associated with one or more data files that are assigned to the node of the data classifier tree. The data files assigned to a node may each include a subset of records having key-values satisfying the conditions for the node and parent nodes of the node. The node, if a parent node, may also store information on pointers to one or more child nodes in a layer below the parent node.

Figure 1B:
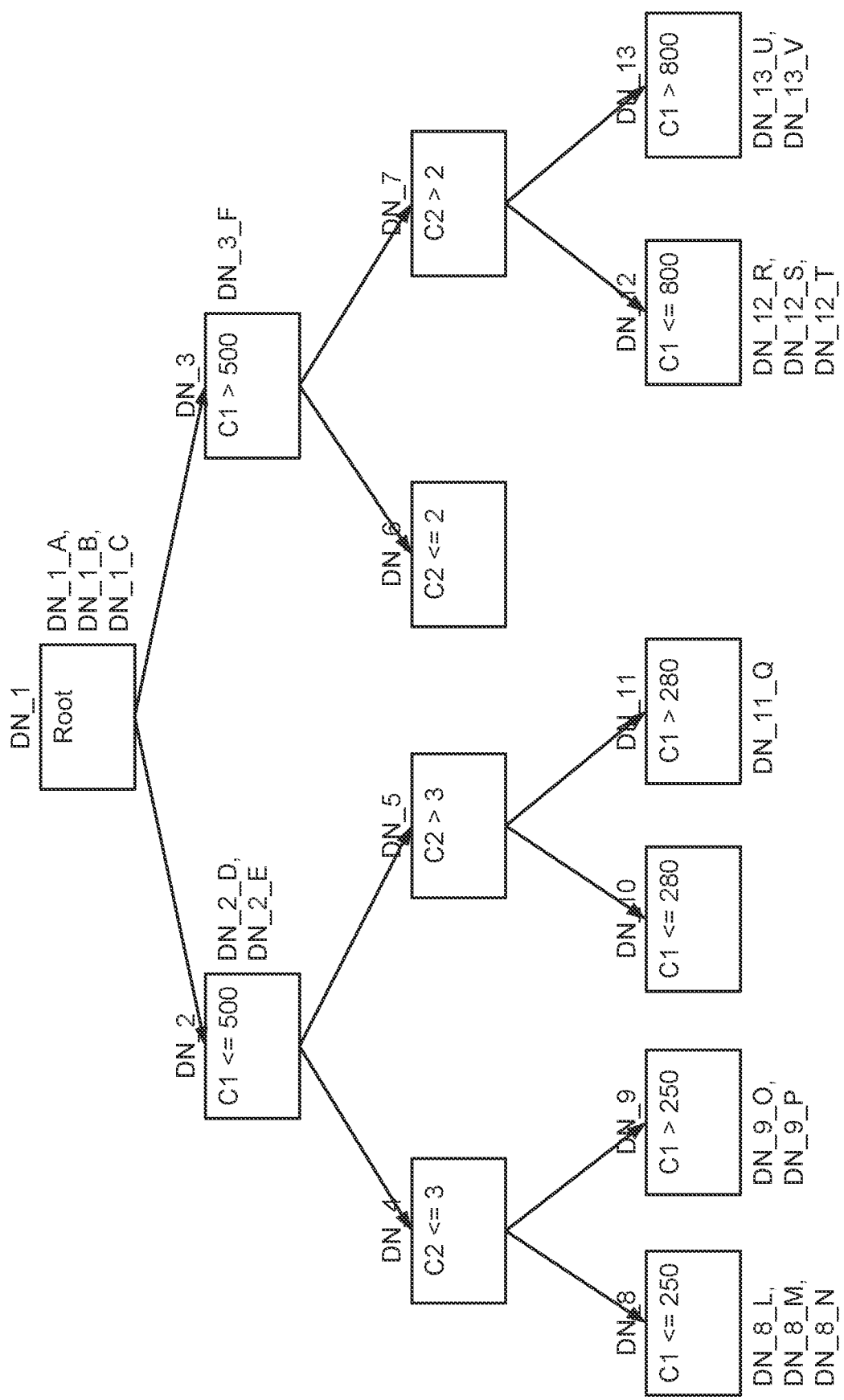
FIG. 1B illustrates an exemplary embodiment of a KD-classifier tree, in accordance with an embodiment.

FIG. 1B illustrates an example data classifier tree, in accordance with an embodiment. The data classifier tree may be stored in association with a data table in the data storage system 110. As illustrated in FIG. 1B, the data classifier tree includes a root node DN_1, one or more intermediate nodes DN_2, DN_3, DN4, DN_5, DN_6, DN_7, and one or more leaf nodes DN_8, DN_9, DN_10, DN_11, DN_12, DN_13 that do not have child nodes. In the data classifier tree of FIG. 1B, each node in the data classifier tree may be associated with one or more data files stored in the data storage system 110 that is assigned to the node. For example, data files DN_1_A, DN_1_B, DN_1_C are assigned to the root node DN_1. As another example, data file DN_3_F is assigned to intermediate node DN_3. As yet another example, data files DN_12_R, DN_12_S, DN_12_T are assigned to leaf node DN_12.

In one embodiment, the nodes of the data classifier tree represent conditions with respect to key-values for one or more keys, and specifically in one instance, two or more keys. For example, in the data classifier tree of FIG. 1B, the nodes of the data classifier tree may alternate between splitting the data of a respective data table with respect to key-values for a first key (e.g., values for key "C1" representing users) at one level of the data tree, and a second key (e.g., values for key "C2" representing time stamp users logged in) at the next level of the data classifier tree, and this ordering may be repeated for remaining levels throughout the depth of the data classifier tree. However, it is appreciated that in other embodiments, the conditions may be represented differently and can be alternated differently depending on how many keys are represented by the data classifier tree and depending on other considerations such as the desired granularity of data skipping for each of the keys. For example, these other embodiments may include nodes with conditions regarding the key-values of the same key that is used in the condition of their parent node, and trees where the conditions of nodes at the same depth in the tree are not with respect to the key-values of the same key.

In one embodiment, the data files including a set of records are assigned to a respective node in the data classifier tree that is the deepest node in the data classifier tree that satisfies the conditions of the key-values of the records in the data file. For example, a data file with key-values for C1 in the range [1, 489] and key-values for C2 in the range [3.2, 5.6] can be assigned to node DN_5. As another example, a data file with key-values for C1 in the range [281, 489] and key-values for C2 in the range [3.2, 5.6] can be assigned to node DN_11. However, it is appreciated that in other embodiments, data files can be assigned to any node in the data classifier tree for which the key-values for the keys in the data file satisfy the conditions represented by the node (e.g., any parent node of DN_11). In one embodiment, the data classifier tree described herein is configured as a binary tree, where each node has two child nodes. However, it is appreciated that in other embodiments, a node may have any number of child nodes and can be configured as a general tree. In some other embodiments, all non-leaf nodes must have the same number of child nodes, while in other embodiments, different nodes are allowed to have different numbers of child nodes.

While the example data classifier tree in FIG. 1B illustrates a tree with 13 nodes, this is for the sake of simplicity, and it is appreciated that in other embodiments, the data table may have a significantly larger number of data files, and thus, in general a larger number of nodes in a data classifier tree. For example, in a data table including millions or billions of data files, the data classifier tree may include millions of nodes each describing a splitting condition for a respective key. For example, the data classifier tree may have 30,000 leaf nodes and 25,000 internal nodes including the root node. Each leaf node may be assigned to approximately 30,000 data files that each have records satisfying the conditions for the two or more keys.

Thus, data files assigned to a respective node in the data classifier tree may include records with a narrower range of key-values compared to those of a parent node, since a greater number of splitting conditions are imposed on the node than the parent node. In other words, within a space defined based on the keys for the data classifier tree, the key-values of data files assigned to a respective node are bounded based on the splitting condition for the node and conditions associated with a parent node of the node. Thus, the bounding box for the respective node may be smaller than a bounding box for a parent node, and therefore, the records assigned to the respective node are clustered at a higher degree than the records for the parent node. In other words, the data in data files of a parent node may have a wider range of key-values for the set of keys than data in data files assigned to a respective child node, and the data files may have varying levels of clustering throughout the depth of the data tree.

As described in more detail below, as records of data files are clustered with a higher level of granularity (i.e., records of data files are assigned to nodes at deeper levels of the data classifier tree), read operations like query operations with a desired range of key-values of interest can be performed with significant data skipping, in which data files with key-values that are irrelevant to the desired range do not have to be read for the query. This allows the operations to be performed faster and in a computationally efficient manner.

In one embodiment, the data processing service 102 receives requests to ingest one or more records to a data table stored in the data storage system 110. The data table may include a set of records that each include values for one or more keys. The data processing service 102 accesses a data classifier tree for the data table. The data processing service 102 traverses the data classifier tree to identify at least one node for which key-values of the two or more keys in the one or more records satisfy conditions for the identified node and ancestor nodes of the identified node. The ancestor nodes of the identified node are the collection of the node's parent node, and the parent node of the node's parent node, and so on, up to the root of the data classifier tree. In one instance, the identified node is the deepest node in the data classifier tree for which the records in the data file satisfies the conditions for.

The data processing service 102 writes the records to a data file (e.g., to the data storage system 100) in association with the identified node of the data classifier tree. For example, in the data classifier tree of FIG. 1B, the data processing service 102 requests a data file to be written in association with the root node DN_1 of the data classifier tree, another data file to be written in association with the node DN_6 of the data classifier tree, and so on. In one instance, one or more existing data files associated with the data classifier tree are rewritten to incorporate the one or more records. In another instance, the one or more records are added to a data table by adding new data files including the records to the data table and associating the new data files to respective nodes of the data classifier tree. In one instance, a data file is written to an assigned node of the data classifier tree by including a node identifier (e.g., DN_1, DN_2, and so on) in the name of the data file as illustrated in FIG. 1B. A more detailed description of the data ingestion process is described below.

In one embodiment, the data processing service 102 receives a request to ingest a plurality of records, which may be provided in the form of one or more data files, or through a network data transfer, or through a queueing system, database access, or by applying a transformation on one or more data sources to produce records, and the like. In such an embodiment, the data processing service 102 can perform an optional pre-processing step on the requested data before the actual ingestion of the records. This allows, for example, the data processing service 102 to cluster and reorganize records in the data files before adding the records to the data table using the data classifier tree.

In one embodiment, when the data processing service 102 receives a request to add records, the data processing service 102 writes the records to arbitrary files using an arbitrary distribution, and then ingests the records as data files, using a procedure for ingesting data files into a data table. In another embodiment, the data processing service 102 clusters the records before writing them to data files, and before ingesting the resulting data files to the data table. The clustering can be done using a variety of techniques, including sorting, multi-dimensional clustering using space-filling curves (e.g., the Z-curve or the Hilbert curve, or KD-tree clustering). The KD-tree clustering can be done independently based on the data. The data processing service 102 can also cluster the records according to the full data classifier tree of the data table. In one instance, the data processing service 102 can cluster the data according to a depth-reduced version of the data classifier tree, but with a different depth, or with a different depth on different paths of the data classifier tree. This has the advantage of not producing very large amounts of small files when the ingested records have very widely distributed key-values.

In some existing implementations of clustering, the data files for a data table are clustered according to a clustering method such as a Z-order method in which records with similar key-values are co-located in the same data files. In such an embodiment, the data processing service 102 may generate local groupings (e.g., Z-cubes) in which a chunk of clustered data files are stored together. As an example, one grouping (e.g., one Z-cube) may include approximately 100 GB of data, resulting in 1,000 data files. However, when a set of new records have to be written to a local grouping or existing data files within a local grouping are updated, typically the entire data in the grouping has to be rewritten, resulting in lack of incrementality and significant latency and use of computational power.

However, by maintaining a data classifier tree that allows various levels of clustering by assigning data files to nodes of various levels of the data classifier tree, the data processing service 102 may store the set of records by assigning the data file to a respective node of the data classifier tree, without major rearrangement of the remaining data files of the data table. Moreover, the data processing service 102 may also perform one or more maintenance operations based on the data classifier tree to rearrange data files of a data table. One type of maintenance operation is when a large number of data files, or a large amount of data, are assigned to an internal node of the data classifier tree, rewriting the data files in such a way that the rewritten data files are clustered further and can be assigned to child or descendant nodes. Another type of maintenance operation is when a large number of data files (e.g., 10,000 files) are assigned to a leaf node of the data classifier tree, splitting the leaf node by adding child nodes to further classify the data files with higher level of granularity, and possibly rewriting the data files in such a way that the rewritten data files can be assigned to the newly created child nodes. Yet another type of maintenance operation is when a small number of data files are assigned to leaf nodes of the data classifier tree, compacting the data files of this set of leaf nodes such that the files are merged and assigned to the parent node of the leaf nodes (i.e., eliminating the leaf nodes). Even when performing such maintenance operations, while the subset of data files associated with the relevant nodes may be updated and rewritten, the majority of the remaining data files of the data table may remain undisturbed.

In one embodiment, the data processing service 102 generates a metadata classifier tree that corresponds to the data classifier tree for the data table. Specifically, in one embodiment, one or more metadata files are stored for a data table in conjunction with the data files. As described in more detail below, a metadata file includes information related to a respective subset of data files, and conveys the state of a data table and its data files. A metadata file may specify the name of each data file, statistics of each data file, size of the file, and the like. A metadata file may also specify one or more transactions (e.g., write, update, add) made to a data file. In one instance, the statistics of a data file in the respective metadata file include minimum and maximum values for a set of keys (e.g., features C1 and C2).

Specifically, when data files for a data table are randomly distributed across the set of metadata files in existing systems, most or all metadata files are read to identify the relevant data files for a read operation with a particular key-value range. When the data table is very large, this process alone can result in significant delay even though the data files themselves might be clustered nicely. Thus, in one embodiment, the data processing service 102 generates a metadata classifier tree corresponding to the data classifier tree for a data table to additionally cluster the metadata files based on the data classifier tree.

Figure 1C:
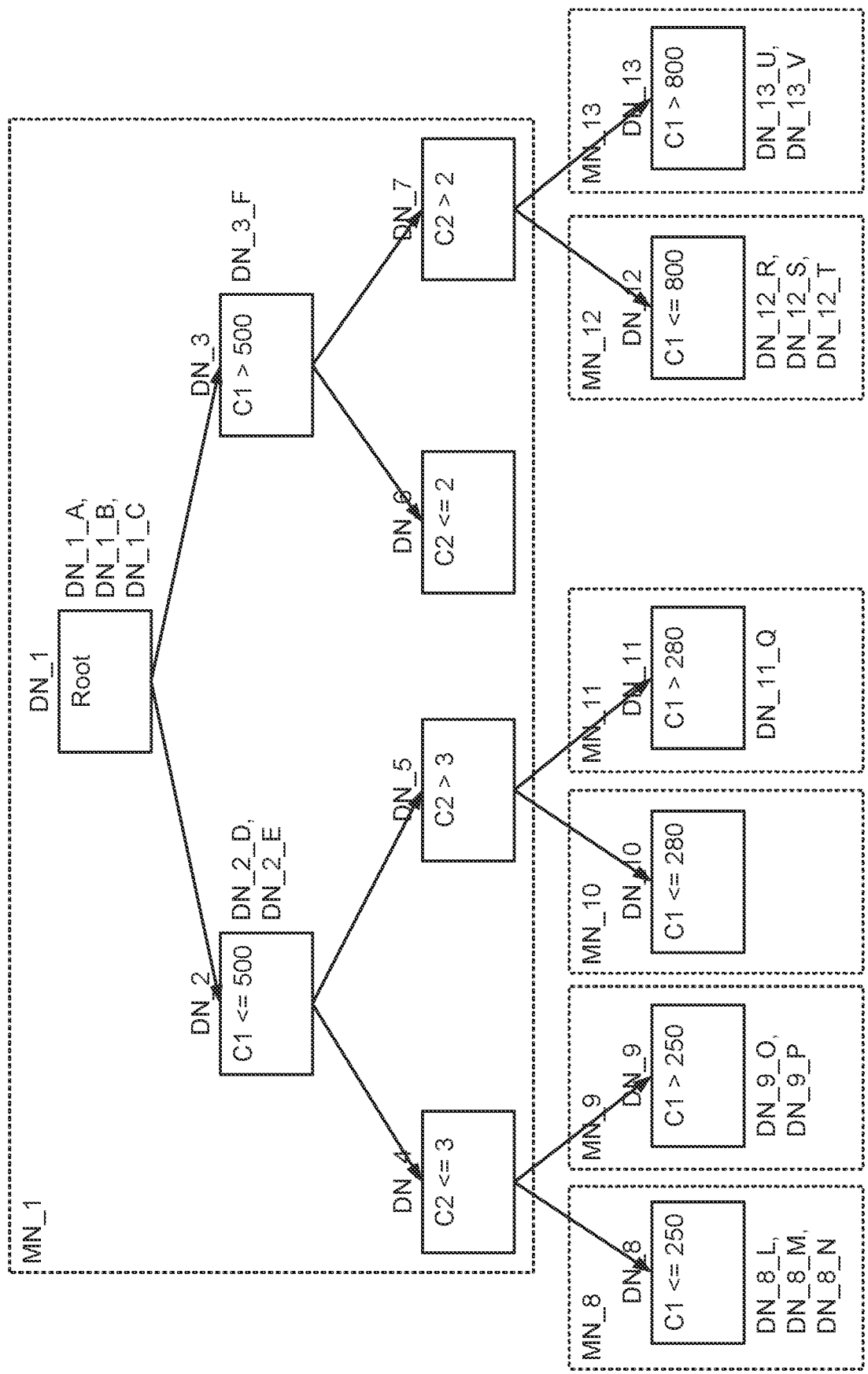
FIG. 1C illustrates an exemplary embodiment of a metadata KD-classifier tree, in accordance with an embodiment.

FIG. 1C illustrates an example metadata classifier tree, in accordance with one or more embodiments. In one embodiment, a node of the metadata classifier tree encompasses one or more nodes of the data classifier tree and is associated with one or more metadata files for the data table. As illustrated in FIG. 1C, the example metadata tree includes a root node MN_1 that encompasses the root node DN_1 and intermediate nodes DN_2, DN_3, DN_4, DN_5, DN_6, DN_7 of the data classifier tree. The example metadata tree also includes leaf nodes MN_8, MN_9, MN_10, MN_11, MN_12, MN-13 that each respectively encompasses leaf nodes DN_8, DN_9, DN_10, DN_11, DN_12, and DN_13 of the data classifier tree.

In particular, a metadata file associated with a node of the metadata classifier tree includes metadata on data files associated with the nodes of the data classifier tree that correspond to the node of the metadata tree. For example, the metadata file assigned to leaf node MN_9 of the metadata classifier tree may include metadata information for all data files DN_9_O, DN_9_P assigned to the leaf node DN_9 of the example data classifier tree. As another example, the metadata files assigned to root node MN_1 of the metadata classifier tree may include metadata information for data files DN_1_A, DN_1_B, DN_1_C, DN_2_D, DN_2_E, DN_3_F assigned to intermediate nodes of the data classifier tree. However, it is appreciated that in other embodiments, the nodes of the metadata classifier tree may encompass a different selection of nodes in the data classifier tree.

Similar to that described in conjunction with FIG. 1B, while the example metadata classifier tree in FIG. 1C illustrates a metadata classifier tree with 7 nodes, this is for the sake of simplicity, and it is appreciated that in other embodiments, the data table may have a significantly larger number of metadata files, and thus, in general a larger number of nodes in a metadata classifier tree. For example, returning to the example with a data classifier tree having 30,000 leaf nodes and 25,000 intermediate nodes, the metadata file assigned to a leaf node of the metadata classifier tree (e.g., MN_12) and encompassing the data files of a respective leaf node of the data classifier tree (e.g., DN_12) may have 10 MB of metadata corresponding to approximately 30,000 descriptors for data files assigned to the same leaf node of the data classifier tree.

In this manner, the data classifier tree can be stored in conjunction with a metadata classifier tree. For a read operation with a desired key-value range, the data processing service 102 traverses the metadata classifier tree to efficiently determine the set of metadata files to process, such that only the subset of metadata files relevant to the read operation are read. The data processing service 102 then processes the selected metadata files to identify a subset of data files to be processed. Therefore, the metadata classifier tree in conjunction with the data classifier tree allows the data processing service 102 to perform read operations with significant metadata skipping, in which metadata files with key-values that are irrelevant to the desired range do not have to be read for the operation, as well as data skipping, in which data files with irrelevant key-values also do not have to be read for the operation.

Specifically, for a read operation with a desired range of key-values, the data processing service 102 retrieves the metadata classifier tree. The data processing service 102 identifies one or more nodes in the metadata classifier tree that overlap with the desired range of key-values. For example, the identified nodes may include the root node (e.g., MN_1) and any children nodes (e.g., MN_12) that overlap with the desired range of key-values. Thus, the traversal of the metadata classifier tree may skip any metadata sub-tree that does not overlap with the range of key-values. Based on the identified set of nodes in the metadata classifier tree, the data processing system 102 may read only those metadata files assigned to the identified nodes and skip the remainder of the metadata files.

For each identified metadata file, the data processing service 102 identifies a subset of data files that overlap with the desired range of key-values for the read operation. The data processing service 102 may read only those data files and retrieve records with the desired key-value and skip the remainder of the data files in the metadata file. The data processing system 102 may read the identified data files and retrieve records with the desired key-value range. Therefore, the data classifier tree and the metadata classifier tree described herein allows for efficient data skipping for both metadata files and data files of a data table, significantly reducing computational burden for read operations.

While the metadata for a data table associated with a data classifier tree may be stored as metadata files as described above, in other embodiments, the metadata or data for a data table may be stored in other formats. In one instance, the metadata for a data table is stored in a database. In such a metadata storage, the database system stores the metadata for data files in memory or in a storage format particular to the database. In such an instance, the metadata classifier tree can be used to associate each metadata record (corresponding to a respective data file) with a node identifier in the metadata classifier tree, depending on the bounding boxes of the metadata record. The data processing service 102 uses an indexing solution provided by the database system to allow for efficient access to metadata records corresponding to particular nodes in the metadata classifier tree. For example, each index key in the database system may correspond to a respective node in the metadata classifier tree, and the metadata records assigned to that particular node are stored in conjunction with the index for that node.

Similar to that described above, to read records for a desired key-value range, the data processing service 102 inspects the metadata records (where each metadata record corresponds to a data file) for index keys in the database system that overlap with the desired key-value range. In this process, the data processing service 102 may skip index keys in the database that do not overlap with the desired key-value range. The data processing service 102 inspects the metadata records for the identified indices to determine data files with bounding boxes overlapping with the desired key-value range. The data processing service 102 reviews the identified data files to obtain records overlapping with the desired key-value range.

Returning to the discussion of FIG. 1A, the control layer 106 of the data processing service 102 is additionally capable of configuring clusters in the data layer 108 that are used to execute the requests. For example, a user of a client device 116 may submit a request to perform one or more query operations and may specify that a number of clusters (e.g., four clusters) on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more operations received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. A tenant of the data processing service 102 may be an entity (e.g., business organization, university, individual user) that may be associated with an established account of the data processing service 102. The data processing service 102 may allocate storage to store data for a tenant and/or computing resources to perform one or more processing operations on the data for the tenant. For example, a respective data layer instance can be implemented for each respective tenant. However, it is appreciated that the data layer 108 can also be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data configured on a cloud platform and may include a commercially provided distributed storage system service. Thus, the data storage system 110 may be managed by the same entity that manages the data processing service 102 or by a separate entity than an entity that manages the data processing service 102. In one embodiment, the data storage system 110 may be included in the data layer 108.

The client devices 116 are computing devices that provide for display of information to users and communicate user actions to the systems of the system environment 100. While two client devices 116A, 116B are illustrated in FIG. 1, in practice many client devices 116 may communicate with the systems (e.g., data processing service 102) of the system environment 100. In one embodiment, a client device 116 is a conventional computer system, such as a desktop or laptop computer. As another example, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the systems of the system environment 100 through a web interface or an application programming interface (API) running on a native operating system of the client device 116, such as IOS® or ANDROID™.

Data Storage System

Figure 2:
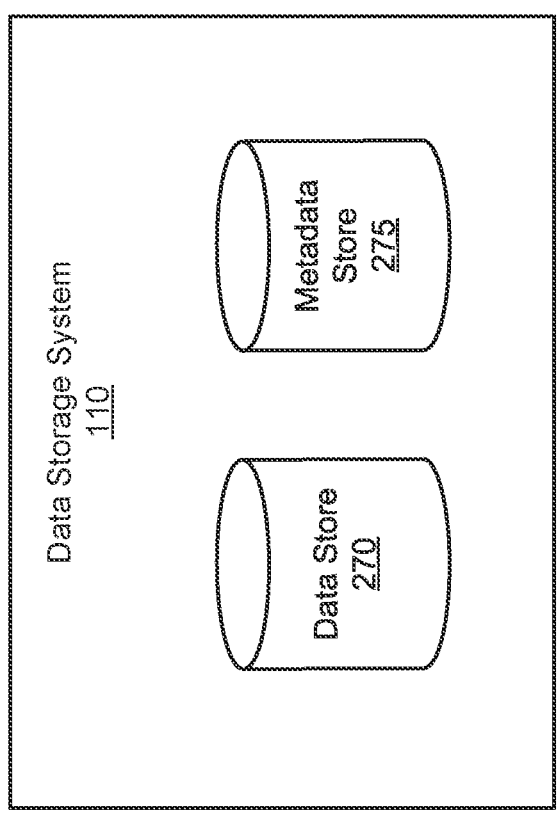
FIG. 2 illustrates a block diagram of an architecture of the data storage system, in accordance with an embodiment.

FIG. 2 illustrates a block diagram of an architecture of the data storage system 110, in accordance with an embodiment. As illustrated in FIG. 2, the data storage system 110 includes a data store 270 and a metadata store 275. The data storage system 110 may have multiple instances of the data store 270 and the metadata store 275, each dedicated to storing data for a tenant of the data processing service 102. In one embodiment, the data store 270 stores data in a format of a data table. A data table may include a set of records, where each record may include values for one or more features or keys. A feature may represent a measurable piece of data that can be used for analysis, such as, login account, timestamp, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

As described above, a data table in the data store 270 may be stored in conjunction with a data classifier tree configured as a KD-classifier tree. Thus, the data files of the data table may be stored in accordance with the data classifier tree. For example, a data file may be assigned to a node of the data classifier tree and may include a node identifier in the name of the data file, and the key-values of in the records of the data file may satisfy conditions represented by the node and parent nodes of the node. However, in other embodiments, it is appreciated that the data file may be associated with a respective node in the data classifier tree by alternative methods.

In one embodiment, a data table may be stored in the data store 270 in conjunction with metadata stored in the metadata store 275. As described above, the metadata store 275 may include one or more metadata files for a data table stored in conjunction with a metadata classifier tree. For example, one or more metadata files associated with a respective node in the metadata classifier tree includes metadata for data files associated with the nodes in the data classifier tree that are encompassed by the node in the metadata classifier tree as described in conjunction with the example metadata classifier tree of FIG. 1C.

In some embodiments, the metadata store 275 is in the form of one or more transaction logs for data tables. A transaction log for a respective data table is a log recording a sequence of transactions that were performed on the data table. A transaction may perform one or more changes to the data table that may include removal, modification, or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110. The metadata in the transaction log may record removal, update, or addition of data files to a data table.

In one embodiment, the transaction log for a data table in the metadata store 275 includes one or more log files that capture a transaction to the data table. In one instance, the log files are in the form of a JSON file or any other standard file format. A log file may include details of one or more transactions made to a respective set of data files of the data table. For example, the log may include the name of the data file, statistics of the data file including min-max ranges for a set of keys, size of the data file, type of transaction (e.g., write, add, update) committed, and the like. The metadata store 275 may also store one or more checkpoint files for the data table. Specifically, a set of checkpoint files describes the state of a data table at a given point in time by analyzing the transactions recorded in the log files until that time. Therefore, metadata for a data table may be characterized by a set of checkpoint files and one or more log files that describe transactions to the data table committed after the set of checkpoint files were created.

In one embodiment, the metadata files stored in conjunction with the metadata classifier tree for a data table may include one or more checkpoint files and one or more log files that describe transactions to the data table. In one instance, the metadata store 275 also maintains a buffer for storing log files capturing the most recent transactions to the data table. These log files stored in the buffer may be maintained separately from the metadata files stored in conjunction with the metadata classifier tree. As described in detail below, the data files which are the subject of these log files in the buffer may be later further clustered or compacted, and the metadata of the data table may be updated and stored in conjunction with the metadata classifier tree after these operations are performed to capture the recent state of the data table.

Control Layer

Figure 3:
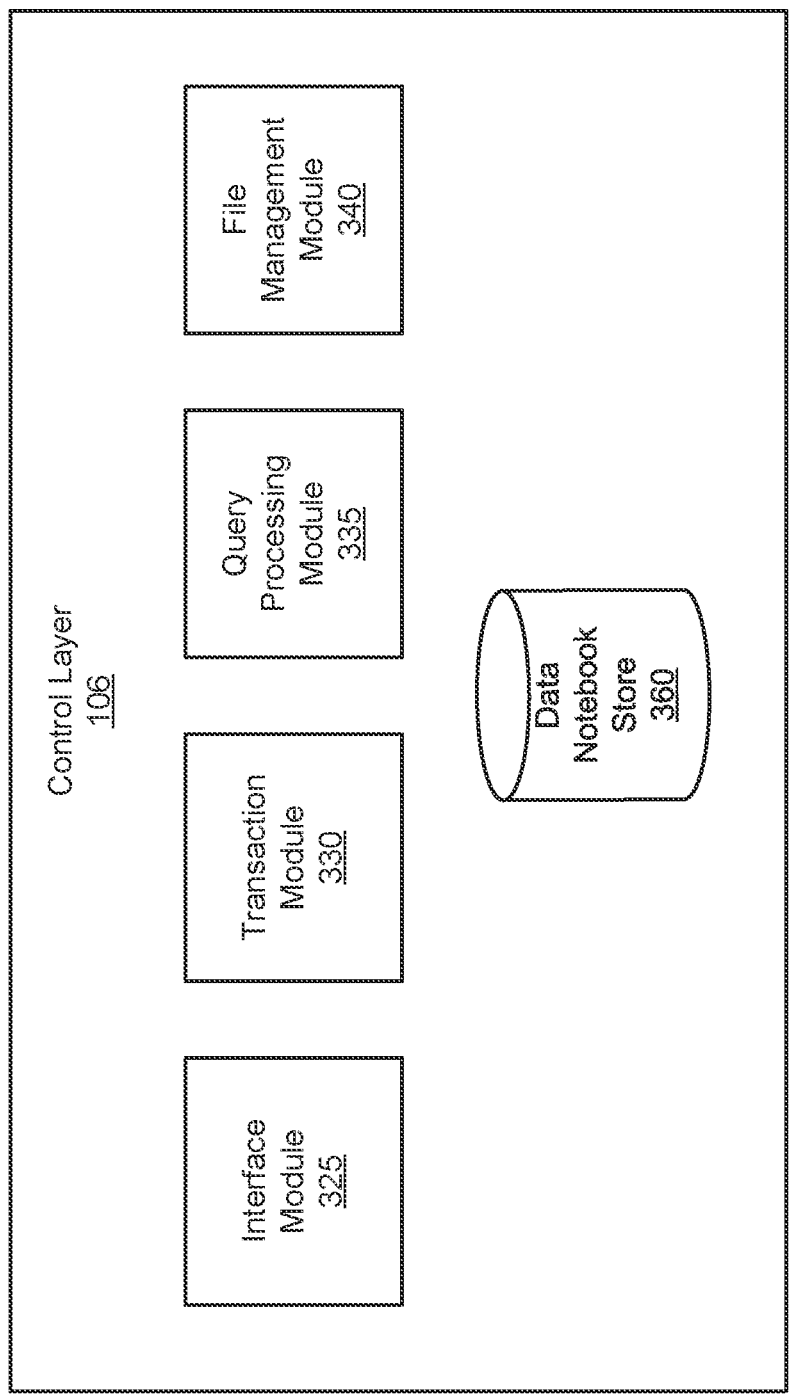
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes an interface module 325, a transaction module 330, a file management module 335, and a data notebook store 360.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

In some embodiments, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 1A, a request to perform a transaction operation may represent one or more changes to the data table. For example, the transaction may be to insert new records into a data table, replace existing records in the data table, delete records in the data table, and the like.

In some embodiments, the transaction module 330 receives a request to perform a transaction operation that writes or ingests a set of data files into a data table. For example, the request may be to add new records or update existing records of the data table. The transaction module 330 may provide instructions to the data layer 108 such that the cluster resources of the data layer 108 retrieve the data files from the data storage system 110 and process the set of records to perform the transaction operation. When the data table is clustered according to a data classifier tree or a metadata classifier tree described herein, the transaction module 330 provides the request or information on the set of data files to the file management module 335. The transaction module 330 may receive instructions on how the one or more data files should be stored in accordance with the clustering of the data classifier tree. For example, the instructions from the file management module 335 may specify one or more node identifiers each data file should be assigned to in the data classifier tree, and the data files may be stored to the data store 270 of the data storage system 110 with a name including the node identifier.

In one embodiment, after writing the data files to the data store 270, the transaction module 330 writes metadata on the ingested data files to the metadata store 275 of the data storage system 110. In one instance, the transaction module 330 may first write the metadata to the buffer of the metadata store 275 in the form of log files that record the changes to the data table by the addition or modification of the ingested data files. After the data files in the data store 270 including the ingested data files have gone through one or more maintenance operations, the transaction module 330 may then write a set of checkpoint files in the metadata store 275 based on the last set of checkpoint files and any log files that were created afterwards to capture the state of the data table. For example, the transaction module 330 may trigger a checkpoint write after approximately metadata for 30,000 data files have been accumulated in the buffer of the metadata store 275.

The transaction module 330 may receive instructions on how the metadata files including the checkpoint files should be stored in accordance with the clustering of the metadata classifier tree. For example, instructions from the file management module 335 may specify one or more node identifiers each metadata file should be assigned to in the metadata classifier tree, and the metadata files may be stored to the metadata store 275 of the data storage system 110 with a name including the node identifier.

The query processing module 335 receives and processes queries that access data stored by the data storage system 110. The queries processed by the query processing module 335 are referred to herein as database queries. For example, the database queries may be specified using a declarative database query language such as the SQL. The query processing module 335 compiles a database query specified using the declarative database query language to generate executable code that is executed. In one embodiment, the query processing module 335 provides one or more queries to appropriate clusters of the data layer 108 and receives responses to the queries from clusters in which the queries are executed.

In one embodiment, the query processing module 335 provides information on the query including a desired range of key-values for one or more keys to the file management module 340. The query processing module 335 receives a subset of identified data files that should be read for the query operation. Specifically, the query processing module 335 may read the data file and identify records that overlap with the desired key-value range to process the query. Since the data classifier tree enables data skipping, and the metadata classifier tree enables metadata skipping, the subset of data files that are read for the query are significantly smaller than the number of data files that compose the data table.

The file management module 340 generates data classifier tree and metadata classifier tree for one or more data tables stored in the data storage system 110. In some embodiments, the file management module 340 generates a data classifier tree for a data table having a set of keys by recursively dividing the records of the data table according to key-values for each key. For example, the file management module 340 selects a splitting condition with respect to a respective key for the nodes of the second level of the data classifier tree (i.e., children nodes of the root node) such that approximately half (or a threshold proportion or number) of the records of the data table can be split into each child node. The file management module 340 may then select another splitting condition with respect to another respective key for the nodes of the third level of the data tree (i.e., child nodes of the intermediate nodes) such that approximately half (or a threshold proportion or number) of the records that belong to each intermediate node can be further split into each child node, and so on, until certain nodes have below a threshold proportion of records that are associated with the node. These nodes may be defined as the leaf nodes.

Similarly, the file management module 340 may also generate a corresponding metadata classifier tree for the data table by defining each node of the metadata classifier tree to correspond to one or more nodes of the data classifier tree for the data table.

In some embodiments, the file management module 340 receives a request from the transaction module 330 that includes information on a set of records to be written to a data table that is clustered according to a data tree and a metadata tree. The information may include the size of the set of records and the data distribution of the key-values of the set of records. For a data file, the file management module 340 identifies a node of the data classifier tree that the data file can be assigned to. The file management module 340 provides the node identifiers for the set of ingested data files to the transaction module 340, such that the transaction module 330 can store the data files in association with the identified nodes of the data classifier tree, and write metadata on the set of ingested files to, for example, log files.

Figure 4A:
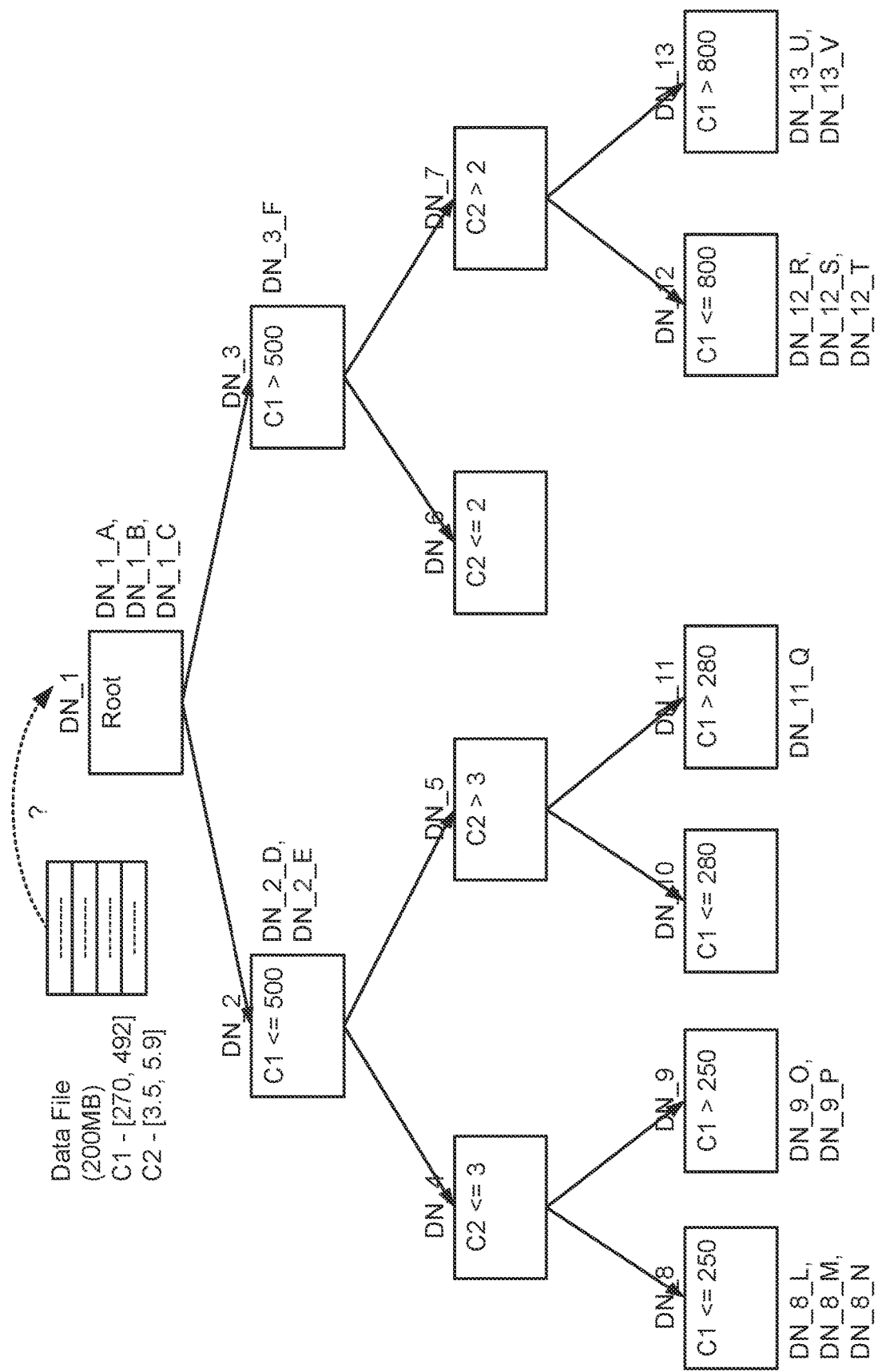
FIGS. 4A-4B illustrates an exemplary method for ingesting new data based on the KD-classifier tree, in accordance with an embodiment.
Figure 4B:
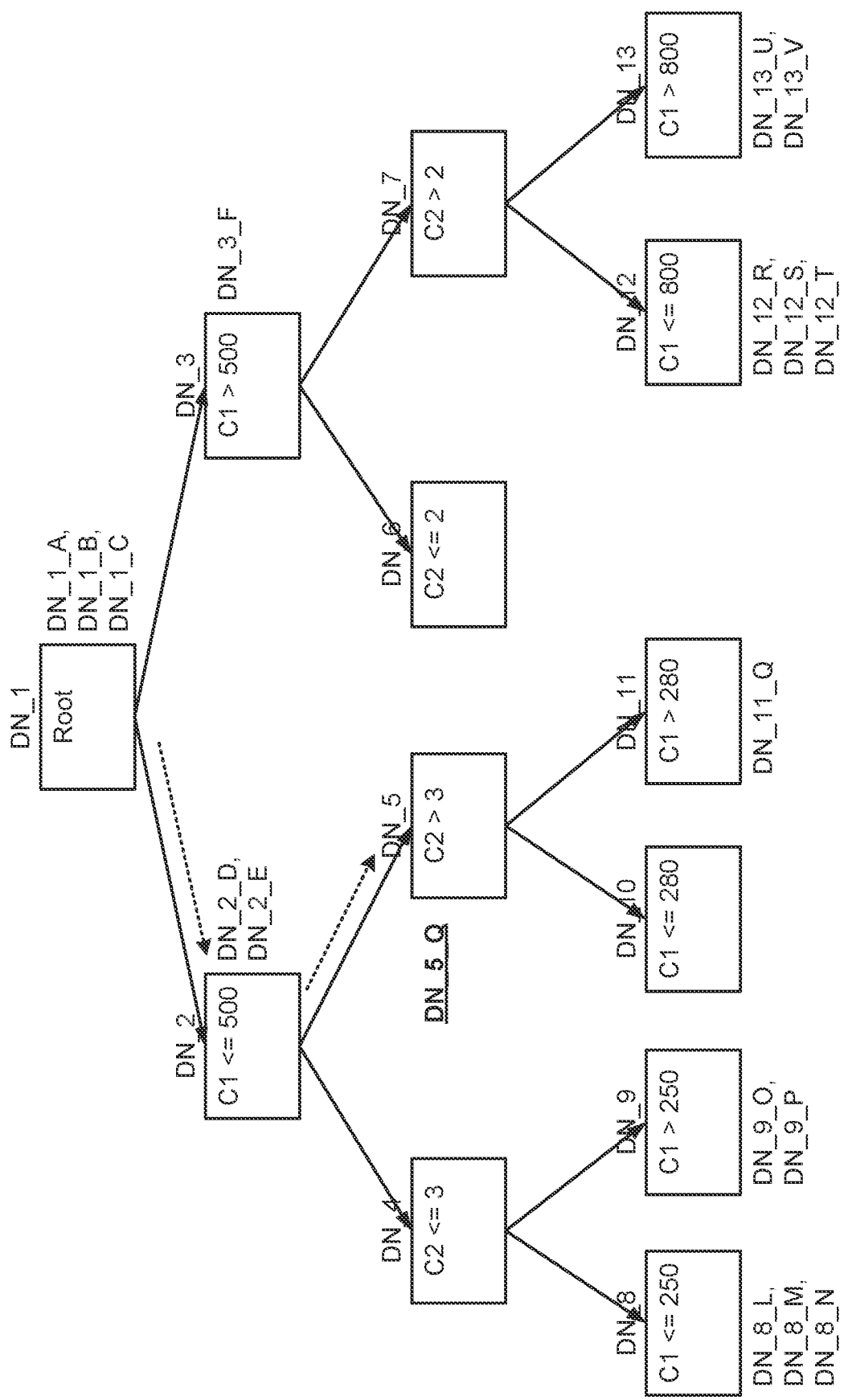

FIGS. 4A-4B illustrates an exemplary method for ingesting data based on the KD data classifier tree, in accordance with some embodiments. In the example shown in FIG. 4A, the transaction module 330 receives a request to ingest a data file including 200 MB of data. In the example shown in FIG. 4B, the file management module 340 determines the deepest node in the data classifier tree that the data file could be assigned to. In particular, the data file to be ingested has a key-value range of [270, 492] for key C1, and a key-value range of [3.5, 5.9] for key C2. In the example shown in FIG. 4B, the file management module 340 starts at the root node DN_1 of the data classifier tree. The file management module 340 proceeds to the next level of the data classifier tree and determines that node DN_2 is relevant since the condition C1<=500 matches that of the data file. The file management module 340 proceeds to the next level of the data classifier tree and determines that node DN_5 is relevant since the condition C2>3 matches that of the data file. However, the file management module 340 may stop at node DN_5 of the data classifier tree since the data file includes key-values for C1 that overlap with both nodes DN_10 and DN_11 of the data classifier tree. The file management module may instruct the transaction module 330 to store the data file in association with node DN_5 of the tree.

In one embodiment, the file management module 340 also performs one or more maintenance operations to further cluster the data files, compact the data files into a smaller number of data files, and the like. For example, the file management module 340 may determine that a large number of data files are assigned to the root of the data classifier tree, and further divide the set of data files at the root node to assign them to children nodes of the root node. For example, a larger write of data files assigned to a root node of the data classifier tree may be rewritten and partially clustered to the next level of nodes in the data classifier tree. However, this may still be helpful since it immediately allows some degree of data skipping.

As another example, the file management module 340 may determine a significant number of smaller data files that were newly ingested, and perform a compaction to generate a single data file that integrates the data across the 1,000 data files into a single data file. By identifying which data files are assigned to respective nodes of the data classifier tree, the file management module 340 can easily determine data files that need further maintenance operations. The file management module 340 may determine which files need further clustering based on the data file sizes and also whether the data files are assigned to relatively shallow nodes (e.g., root node and upper intermediate nodes) of the data classifier tree.

Moreover, in certain cases, the maintenance operations performed by the file management module 340 and the checkpoint writing performed by the transaction module 330 need to be coordinated synchronously with each other. However, the data classifier tree and the metadata classifier tree described herein allows these two types of operations to be performed asynchronously. For example, a set of 1,000 newly ingested data files may be assigned to one or more identified nodes of the data classifier tree, and the metadata for the newly ingested files may be written temporarily to log files in the buffer of the metadata store 275. The set of 1,000 data files may be compacted to a single data file via a compaction operation. While the bounding box of such a data file might be relatively large and the data file will likely be assigned to the root node of the data classifier tree, there is only one single file, so the penalty to data skipping will be relatively small.

The transaction module 330 may perform checkpoint writing to incorporate any changes to the data table recorded in the log files, and the checkpoint files may be incorporated into the set of metadata files that are associated with the metadata classifier tree. In this manner, maintenance operations and checkpoint metadata writing can loosely coordinate with one another and benefit from one another without having to perform one another synchronously.

While the data classifier tree and the metadata classifier tree may be also constructed with respect to a single key, this may result in a data tree that is disproportionately deeper for certain traversal paths. For example, when the key-value is a timestamp, the bulk of newly ingested records may have timestamps that are more recent, and therefore, may the nodes of the data tree that are associated with more-recent timestamp values would be more likely to overspill. This may cause the leaf nodes along these paths to further split, and so on, such that the data tree is disproportionately deeper along these nodes compared to other paths of the data tree. By splitting the data through two or more keys, the data classifier tree (and the corresponding metadata classifier tree) can be further grown in a relatively balanced way than a data tree split with a single key.

Moreover, in some instances, users of the data processing service 102 may request that the data files of the table be re-clustered using a new set of keys. For example, in the example of FIGS. 1B-1C and FIGS. 4A-4B, the user may request that the data files be clustered using keys C3, C4, and C5 of the data table. In such an instance, the file management module 340 may generate a new data classifier tree and a metadata classifier tree. While the existing set of data files for the data table are very likely candidates for maintenance operations (to re-cluster the data based on the new set of keys), the data skipping and metadata skipping performance of these data files will be the same with respect to the old set of keys if the metadata files for data files that are associated with the previous data classifier tree are clustered according to the previous metadata classifier tree, so read operations that are performed based on the old set of keys will not have any degradation in performance. In one embodiment, the data files may stay associated with the data classifier tree and the node in the tree to which they were clustered and associated with, and the metadata for the data files are clustered separately for each previous metadata classifier tree.

In one embodiment, the file management module 340 receives information on a query from the query processing module 335 that includes a desired range of key-values. The file management module 340 retrieves and traverses the metadata classifier tree to identify one or more nodes that overlap with the desired key-value range. The file management module 340 obtains metadata files assigned to the identified nodes. The file management module 340 also obtains log files in the buffer of the metadata store 275 describing changes to the data table. The file management module 340 reads the identified metadata files and log files and determines a subset of data files that overlap the desired key-value range. The file management module 340 provides the subset of data files to the query processing module 335.

Ingesting Records to a Data Table Using Data Classifier Tree

Figure 5:
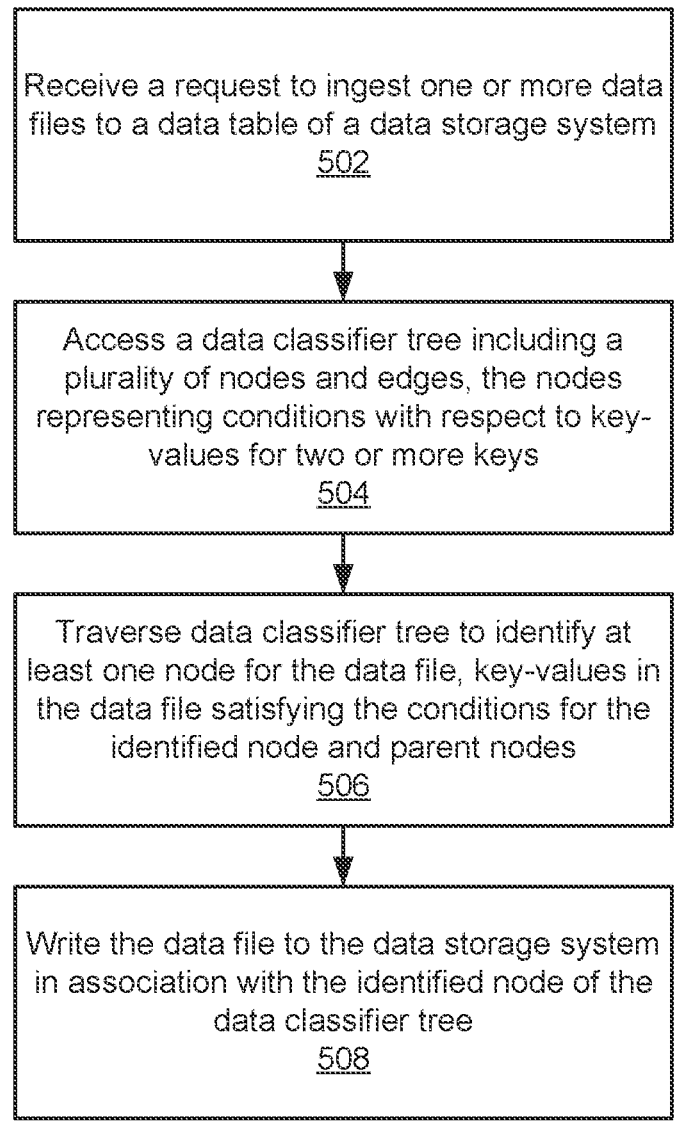
FIG. 5 is a flowchart of a method for ingesting a set of records into a data table clustered using a KD-classifier tree, in accordance with an embodiment.

FIG. 5 is a flowchart of a method for ingesting a set of records into a data table clustered using a KD-classifier tree, in accordance with an embodiment. The process shown in FIG. 5 may be performed by one or more components (e.g., the control layer 106, the file management module 340, or the transaction module 330) of a data processing system/service (e.g., the data processing service 102). Other entities may perform some or all of the steps in FIG. 5. The data processing service 102 as well as the other entities may include some of the components of the machine (e.g., computer system) described in conjunction with FIG. 7. Embodiments may include different and/or additional steps, or perform the steps in different orders.

The data processing service 102 receives 502, from a client device, a request to ingest one or more data files to a data table in a data storage system. The data table may include a set of records, a record including values for one or more keys. The data processing service 102 accesses 504 a data classifier tree for the data table. In one embodiment, the data classifier tree includes a set of nodes and edges. The nodes of the data classifier tree represent conditions with respect to key-values for two or more keys. For each data file in the one or more data files, the data processing service 102 traverses 506 the data classifier tree to identify at least one node for the data file. The key-values for the two or more keys in the data file satisfy the condition for the identified node and ancestor nodes of the identified node. The data processing service 102 writes 508 the data file to the data storage system 110 in association with the identified node of the data classifier tree.

Data Skipping Using Data Classifier Tree and Metadata Classifier Tree

Figure 6:
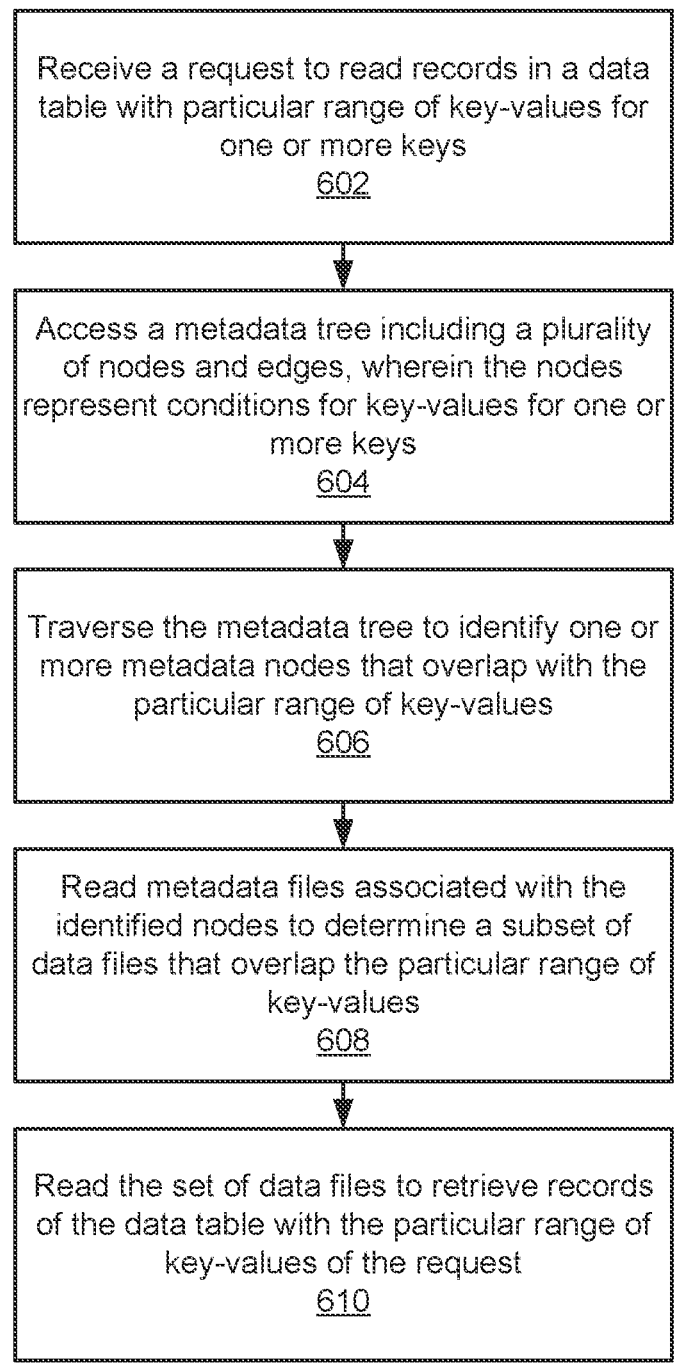
FIG. 6 is a flowchart of a method for metadata and data skipping using a KD-classifier tree and a metadata KD-classifier tree, in accordance with an embodiment.

FIG. 6 is a flowchart of a method for data skipping using a KD-classifier tree and a metadata classifier tree, in accordance with an embodiment. The process shown in FIG. 6 may be performed by one or more components (e.g., the control layer 106 or the file management module 340) of a data processing system/service (e.g., the data processing service 102). Other entities may perform some or all of the steps in FIG. 6. The data processing service 102 as well as the other entities may include some of the components of the machine (e.g., computer system) described in conjunction with FIG. 7. Embodiments may include different and/or additional steps, or perform the steps in different orders.

The data processing service 102 receives 602, from a client device, a request to read records in a data table with a particular range of key-values for one or more keys. The data table includes a set of records, and a record includes values for the one or more keys. The data processing service 102 accesses 604 a metadata classifier tree for the data table including a plurality of nodes and edges. The nodes of the metadata classifier tree represent conditions with respect to key-values for the one or more keys. A node is associated with a metadata file that includes metadata on one or more data files with records having key-values satisfying the condition for the node and conditions associated with parent nodes of the node. The data processing service 102 traverses 606 the nodes of the metadata classifier tree to identify one or more nodes with conditions that overlap the particular range of key-values for the one or more keys. The data processing service 102 reads 608 the metadata files associated with the identified nodes of the metadata classifier tree to determine a set of data files specified in the metadata files of the identified nodes with key-values that overlap with the particular key-value range. The data processing service 102 reads 610 the set of data files to retrieve records of the data table with the particular range of key-values of the request.

Figure 7:
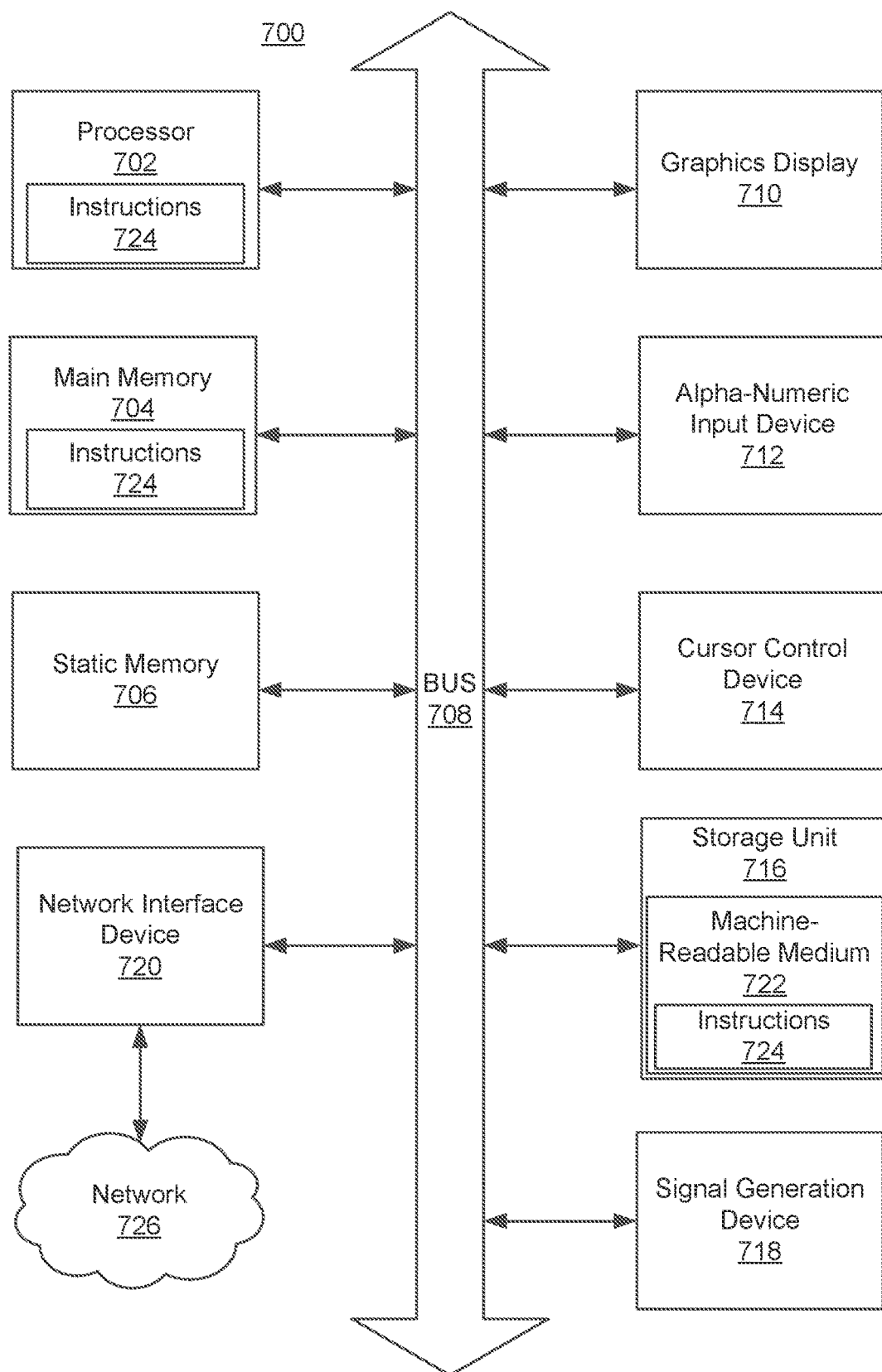
FIG. 7 is a block diagram illustrating an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:
   receiving, from a client device, a request to ingest one or more data files to a data table in a data storage system, the data table including a set of records, a record including values for one or more keys;
   accessing a data classifier tree for the data table, the data classifier tree including a set of nodes and edges, the nodes of the data classifier tree representing conditions with respect to key-values for two or more keys;
   for a data file in the one or more data files, traversing the data classifier tree to identify at least one node for the data file, key-values for the two or more keys in the data file satisfying the condition for the identified node and conditions associated with ancestor nodes of the identified node; and
   writing the data file to the data storage system in association with the identified node of the data classifier tree.

2. The method of claim 1, writing the data file to the data storage system in association with the identified node further comprising writing a name of the data file to include a node identifier identifying the node of the data classifier tree.

3. The method of claim 1, further comprising performing a clustering operation on the data table based on the data classifier tree, the clustering operation comprising pushing records of a data file assigned to a parent node to data files assigned to child nodes of the parent node in the data classifier tree.

4. The method of claim 1, further comprising:
   receiving, from a client device, a request to read records in the data table with a particular range of key-values for the two or more keys;
   accessing a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with parent nodes of the node;
   traversing the nodes of the metadata classifier tree to identify one or more nodes with conditions that overlap the particular range of key-values for the one or more keys;
   reading the metadata files associated with the identified one or more nodes of the metadata classifier tree to determine a subset of data files specified in the metadata files of the identified nodes with key-values that overlap with the particular key-value range; and
   reading the subset of data files to retrieve records of the data table with the particular range of key-values of the request.

5. The method of claim 1, further comprising:
   adding a new set of data files by ingesting the new set of data files or by performing one or more maintenance operations to change one or more data files into the new set of data files;
   accessing a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with ancestor nodes of the node; and
   writing a metadata file describing metadata on the new set of data files, the metadata file assigned to a node in the metadata classifier tree for which conditions represented by the node and parent nodes of the node are consistent with the subset of data files described in the metadata file.

6. The method of claim 5, further comprising:
   prior to accessing the metadata classifier tree, writing metadata on the new set of data files to a metadata log file as a buffer.

7. The method of claim 5, wherein the one or more maintenance operations comprises at least a compaction operation to compact the one or more data files into one data file or a reclustering operation that combines records in the one or more data files and reclusters the records into the new set of data files.

8. The method of claim 1, wherein the identified node is a deepest node in the data classifier tree for which conditions represented by the identified node and ancestor nodes of the identified node are consistent with the key-values for the two or more keys in the data file satisfy.

9. A non-transitory computer readable medium comprising stored instructions, the stored instructions when executed by at least one processor of one or more computing devices, cause the one or more computing devices to:
   receive, from a client device, a request to ingest one or more data files to a data table in a data storage system, the data table including a set of records, a record including values for one or more keys;
   access a data classifier tree for the data table, the data classifier tree including a set of nodes and edges, the nodes of the data classifier tree representing conditions with respect to key-values for two or more keys;
   for a data file in the one or more data files, traverse the data classifier tree to identify at least one node for the data file, key-values for the two or more keys in the data file satisfying the condition for the identified node and conditions associated with parent nodes of the identified node; and
   write the data file to the data storage system in association with the identified node of the data classifier tree.

10. The non-transitory computer readable medium of claim 9, the instructions further causing the computing devices to write a name of the data file to include a node identifier identifying the node of the data classifier tree.

11. The non-transitory computer readable medium of claim 9, the instructions further causing the computing devices to perform a clustering operation on the data table based on the data classifier tree, the instructions causing the computing devices to push records of a data file assigned to a parent node to data files assigned to child nodes of the parent node in the data classifier tree.

12. The non-transitory computer readable medium of claim 9, the instructions further causing the computing devices to:
receive, from a client device, a request to read records in the data table with a particular range of key-values for the two or more keys;
access a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with parent nodes of the node;
traverse the nodes of the metadata classifier tree to identify one or more nodes with conditions that overlap the particular range of key-values for the one or more keys;
read the metadata files associated with the identified one or more nodes of the metadata classifier tree to determine a subset of data files specified in the metadata files of the identified nodes with key-values that overlap with the particular key-value range; and
read the subset of data files to retrieve records of the data table with the particular range of key-values of the request.

13. The non-transitory computer readable medium of claim 9, the instructions further causing the computing devices to;
add a new set of data files by ingesting the new set of data files or performing one or more maintenance operations change one or more data files into the new set of data files;
access a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with ancestor nodes of the node; and
write a metadata file describing metadata on the new set of data files, the metadata file assigned to a node in the metadata classifier tree for which conditions represented by the node and parent nodes of the node are consistent with the subset of data files described in the metadata file.

14. The non-transitory computer readable medium of claim 13, the instructions further causing the computing devices to:
prior to accessing the metadata classifier tree, writing metadata on the new set of data files to a metadata log file as a buffer.

15. The non-transitory computer readable medium of claim 13, wherein the one or more maintenance operations comprises at least a compaction operation to compact the one or more data files into one data file or a reclustering operation that combines records in the one or more data files and reclusters the records into the new set of data files.

16. The non-transitory computer readable medium of claim 9, wherein the identified node is a deepest node in the data classifier tree for which conditions represented by the identified node and ancestor nodes of the identified node are consistent with the key-values for the two or more keys in the data file satisfy.

17. A computer system, comprising:
a computer processor; and
a non-transitory computer-readable storage medium comprising instructions that when executed by the computer processor, cause the computer system to:
receive, from a client device, a request to ingest one or more data files to a data table in a data storage system, the data table including a set of records, a record including values for one or more keys;
access a data classifier tree for the data table, the data classifier tree including a set of nodes and edges, the nodes of the data classifier tree representing conditions with respect to key-values for two or more keys;
for a data file in the one or more data files, traverse the data classifier tree to identify at least one node for the data file, key-values for the two or more keys in the data file satisfying the condition for the identified node and conditions associated with parent nodes of the identified node; and
write the data file to the data storage system in association with the identified node of the data classifier tree.

18. The computer system of claim 17, the instructions causing the computer system to write a name of the data file to include a node identifier identifying the node of the data classifier tree.

19. The computer system of claim 17, the instructions further causing the computer system to perform a clustering operation on the data table based on the data classifier tree, the instructions causing the computer system to push records of a data file assigned to a parent node to data files assigned to child nodes of the parent node in the data classifier tree.

20. The computer system of claim 17, the instructions further causing the computer system to:
receive, from a client device, a request to read records in the data table with a particular range of key-values for the two or more keys;
access a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with parent nodes of the node;
traverse the nodes of the metadata classifier tree to identify one or more nodes with conditions that overlap the particular range of key-values for the one or more keys;
read the metadata files associated with the identified one or more nodes of the metadata classifier tree to determine a subset of data files specified in the metadata files of the identified nodes with key-values that overlap with the particular key-value range; and
read the subset of data files to retrieve records of the data table with the particular range of key-values of the request.

21. The computer system of claim 17, the instructions further causing the computer system to:
add a new set of data files by ingesting the new set of data files or performing one or more maintenance operations change one or more data files into the new set of data files;

access a metadata classifier tree for the data table including a second set of nodes and edges, the nodes of the metadata classifier tree representing conditions with respect to key-values for the two or more keys, a node associated with a metadata file that includes metadata on one or more data files with records having key-values satisfying the condition for the node and conditions associated with ancestor nodes of the node; and write a metadata file describing metadata on the new set of data files, the metadata file assigned to a node in the metadata classifier tree for which conditions represented by the node and parent nodes of the node are consistent with the subset of data files described in the metadata file.

22. The computer system of claim 21, the instructions further causing the computer system to:

prior to accessing the metadata classifier tree, writing metadata on the new set of data files to a metadata log file as a buffer.

23. The computer system of claim 21, wherein the one or more maintenance operations comprises at least a compaction operation to compact the one or more data files into one data file or a reclustering operation that combines records in the one or more data files and reclusters the records into the new set of data files.

* * * * *